Mar. 6, 1923. 1,447,414.
T. P. EUSTEGE.
KETTLE OR OTHER UTENSIL FOR HEATING WATER OR THE LIKE.
FILED JUNE 17, 1921.

Thomas P. Eustege
Inventor
by C. A. Snow & Co., Attys.

Patented Mar. 6, 1923.

1,447,414

UNITED STATES PATENT OFFICE.

THOMAS PETER EUSTEGE, OF HATAITAI, WELLINGTON, NEW ZEALAND.

KETTLE OR OTHER UTENSIL FOR HEATING WATER OR THE LIKE.

Application filed June 17, 1921. Serial No. 478,415.

*To all whom it may concern:*

Be it known that I, THOMAS PETER EUSTEGE, a subject of the King of Great Britain, residing at Hohiria Road, Hataitai, in the Provincial District of Wellington, in the Dominion of New Zealand, have invented certain new and useful Improvements in Kettles or Other Utensils for Heating Water or the like, of which the following is a specification.

This invention comprises certain improvements in utensils for heating water or the like, and particularly relates to stove kettles; and it has for its object to prevent waste of the heat generated by the gas burner or other source of heat, whilst moreover also ensuring that the water will be more quickly boiled than is the case with kettles or the like as heretofore constructed.

According to the present improvements the bottom of the utensil is of a stepped conical shape so that the flame or heat rays are deflected from the surface inwards, thereby preventing the heat rays or the flame from escaping away from the bottom of the utensil. By this invention also a very large surface is presented to the flame so that the heat can be more readily absorbed by the water; and the surface is also such that a quick circulation of the water takes place; thus still further enabling the water to absorb the heat thereby quickly facilitating the absorption of the heat before the same can escape into the atmosphere. Preferably the bottom of the utensil is formed of a number of annular steps, the top of which reaches to a considerable height up the centre of the kettle. The bottom of these annular steps conveniently incline downwardly towards the centre to thereby trap the flames as the same tends to pass from one step to another. The corners of these steps present a large heating surface to the small quantity of water in such corners, with the result that the water quickly heats and rises to produce a quick circulation of the water. This circulation brings the cooler water to the heating surfaces and enables the water to more quickly absorb the heat and thus provides an additional security against the heat escaping away from the kettle.

Figure 1:
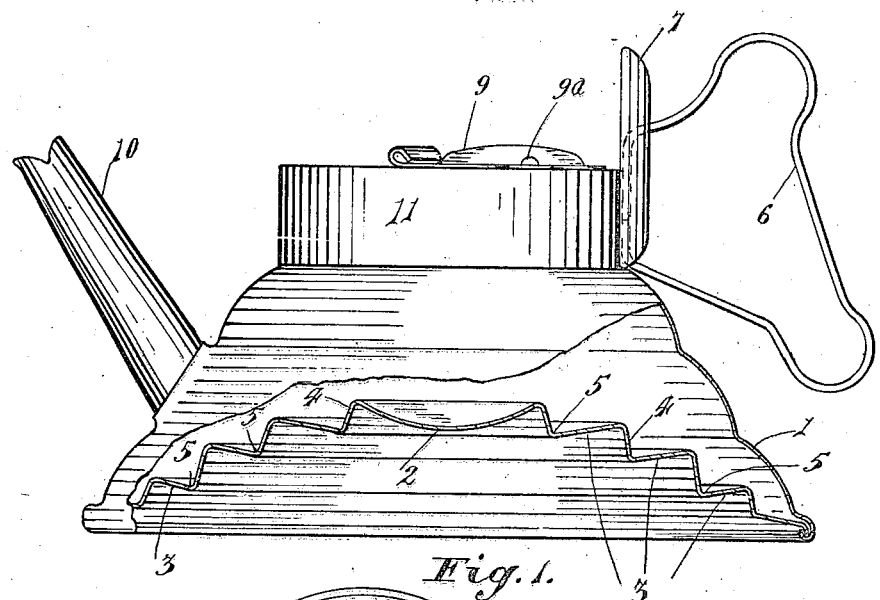
Figure 1 is a side elevation of a stove kettle constructed according to this invention, the lower part of the kettle being shewn in section.
Figure 2:
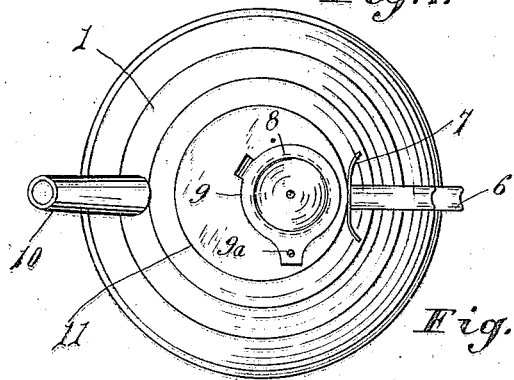
Figure 2 is a plan view.
Figure 3:
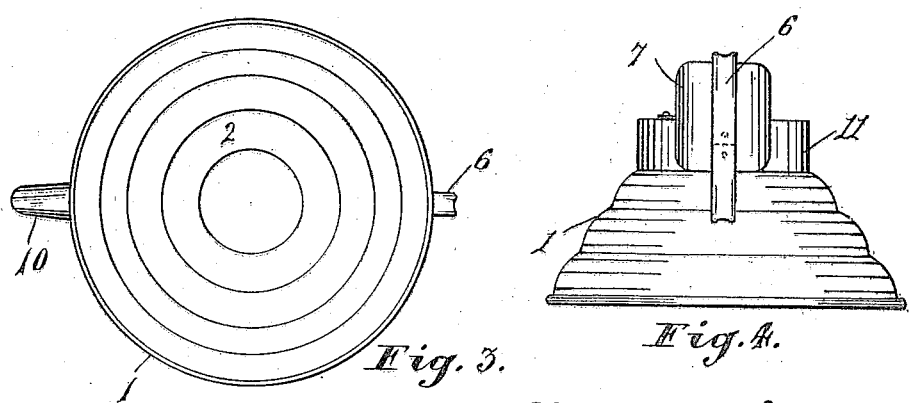
Figure 3 is an underside view.
Figure 4:
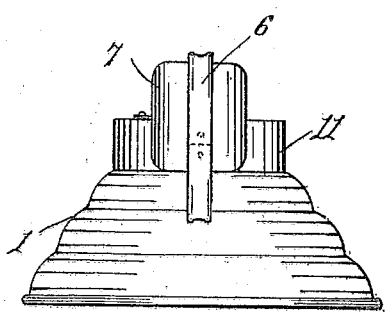
Figure 4 is a side elevation of the kettle looking in the direction of the handle.

According to a convenient embodiment of this invention, as applied to a spun, stamped or sheet metal stove kettle, the same comprises a body 1 which is conical shaped so as to enable the bottom of the kettle to present a large surface to the source of heat. The bottom plate 2 is of a stepped conical shape, the wall 3 of the steps inclining downwardly towards the centre of the kettle. With this construction not only is a very large heating surface obtained in relation to the contents of the kettle by forming such kettle conical, but the stepped bottom still further increases the heating surface. Yet again the inclination of the stepped portions 3 also gives a still further increased heating surface. These inclined surfaces 3 of the steps also tend to throw the fringes of the flame against the vertical portions 4 of the steps and therefore keeps the flame from spreading to the outside of the kettle. The water lying at the corners 5 formed by the steps is quickly heated owing to the large heating surface presented to the small volume of water, with the result that the water lying in these corners quickly heats and therefore forms quick circulation of the water in the kettle. Thus the cooler water quickly circulates to the heating surface and absorbs the heat applied to the bottom which also aids in preventing the escape of heat from the underside of the kettle. The handle 6 comprises a beaded strip of metal which is riveted or bolted to the body of the kettle, a shield 7 being fixed between the handle and the body. The mouth of the kettle 8 is conveniently covered by a cap 9 pivoted on the pin 9ª to the top of the kettle. A kettle thus constructed is not only of great utility but presents an extremely neat appearance.

In order to strengthen the conical body of the kettle, such body may be fluted as illustrated. Whilst the invention has been described in this application to a stove kettle the invention may be applied to other heating utensils.

Claims:

1. A stove kettle or like heating utensil comprising a stepped closed conical bottom, lower walls on the stepped portions which incline downwardly towards the interior centre of the utensil and corners formed by the stepped portions which present a large heating surface to a small quantity of water to produce a quick circulation, substantially as set forth.

2. A stove kettle or like heating utensil comprising a conical body, a stepped conical bottom at the largest end of the conical body, lower walls on the stepped portions which incline downwardly towards the centre of the utensil and corners formed by the stepped portions which present a large heating surface to a small quantity of water to produce a quick circulation, substantially as set forth.

3. A stove kettle or like heating utensil comprising a stepped closed conical bottom, lower walls on the stepped portions which incline downwardly towards the centre of the utensil, side walls on the stepped portions which taper outwardly and corners formed by the stepped portions which present a large heating surface to a small quantity of water to produce a quick circulation, substantially as set forth.

In witness whereof I have signed this specification in presence of two witnesses.

THOMAS PETER EUSTEGE.

Witnesses:
H. S. LOCKWOOD,
I. WILLIAMS.